(No Model.)
J. C. WILSON.
POLARIZED ELECTRO MAGNET.
No. 362,135. Patented May 3, 1887.
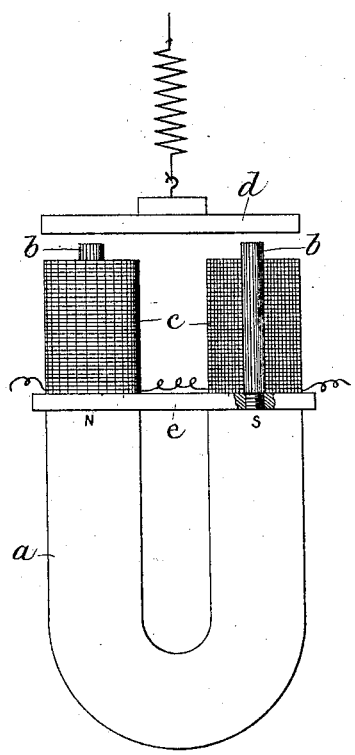
Witnesses:
J. A. Rennie.
C. M. Cone.
Inventor
John C. Wilson
Per Crosby & Gregory.
his Attys.

UNITED STATES PATENT OFFICE.

JOHN C. WILSON, OF BOSTON, MASSACHUSETTS.

POLARIZED ELECTRO-MAGNET.

SPECIFICATION forming part of Letters Patent No. 362,135, dated May 3, 1887.

Application filed August 24, 1885. Serial No. 175,197. (No model.)

*To all whom it may concern:*

Be it known that I, JOHN C. WILSON, of Boston, county of Suffolk, State of Massachusetts, have invented an Improvement in Polarized Electro-Magnets, of which the following description, in connection with the accompanying drawing, is a specification, like letters on the drawing representing like parts.

My invention relates to an electro-magnet of that class in which a permanent steel magnet and an inductor are placed in magnetic contact with each other, the said inductor consisting of soft-iron cores and inductive coils wound thereon, so that an electric current passing through the said coils may produce changes in the magnetization of the cores induced by the permanent magnet. In magnets of this class as heretofore made the cores of the inductor have been independently connected with the poles of the permanent magnet and have had no magnetic connection between them, except through the said permanent magnet, and they have commonly been employed in connection with an armature having a retractor of slightly less power than the attractive force of the cores derived from the permanent magnet by induction, so that the said armature may be released or retracted by the application of a current in the coils of proper direction to partly neutralize the magnetism derived from the permanent magnet, thus weakening the attractive force so that it is overcome by the retractor. The magnetism induced in the cores from the coils reacts on the permanent magnet, and, if sufficiently strong currents are employed, may neutralize or reverse the magnetism of the permanent magnet. It is desirable for certain purposes to use magnets of this class with very strong currents without, however, changing the amount or polarity of the magnetism in the permanent magnet, and I have discovered that this result can be accomplished by providing a magnetic connection between the cores of the inductor at or near the poles of the permanent magnet by means of a bar of soft iron or otherwise, said connection being insufficient to absorb the entire magnetic charge of the permanent magnet, so that the cores will still be affected inductively from the magnet, but when affected by the coils wound upon them the magnetism will find its circuit mainly through the connection between cores of the inductor rather than through the permanent magnet, which latter will be only slightly affected by the magnetism induced from extraneous sources in the cores, and as soon as the inducing current is removed the permanent magnet will again affect the cores the same as before the current was applied.

The drawing shows an electro-magnetic instrument embodying this invention, one of the coils being shown in section.

The device or instrument consists, essentially, of a permanent electro-magnet, $a$, and an inductor consisting of soft-iron cores $b$, having wound upon them inductive coils $c$, said inductor being joined with the permanent magnet or placed in magnetic contact with it, that the instrument may be connected in electric circuit in the usual manner, so that an electric current going through them will produce by induction a magnetic change in the cores $b$ of the inductor.

In instruments of this class as usually constructed there has been no magnetic connection between the cores $b$ other than that provided by the magnet $a$ and an armature or keeper, and consequently a current in the coil $c$ produces an effect throughout the magnet $a$ which may be sufficient to annul or even to reverse the polarity of the permanent magnetism in the magnet $a$, so that when the current is withdrawn the said magnet will no longer produce the same effect on the cores $b$ as before such powerful current was applied. Such a change in the condition of the permanent magnet would be detrimental to or wholly destroy the usefulness of the instrument for many purposes, and such instruments as heretofore constructed can consequently be used with safety only with very weak currents of the polarity to oppose that of the permanent magnet, so that it is not possible in practice to wholly neutralize or reverse the polarity of the cores, but only to slightly weaken the magnetic charge therein. Consequently, when the instrument is to be used to control an armature, $d$, the margin between the opposing forces which control the said armature has to be very small. I have discovered that this defect in the instrument can be wholly removed, and the instrument so made that the magnet $a$ will be practically unaffected by changes produced in the cores of the inductor from the coil $c$ thereon or otherwise, although the said cores will be readily affected by the magnet $a$. This result is accomplished by connecting the cores at or near their junction with the poles of the permanent magnet by a magnetic connector, $e$, preferably of soft iron, which, together with the cores $b$, forms practically a horseshoe electro-magnet of usual construction.

The connector $e$ is of sufficient capacity to absorb the whole magnetic effect of the magnet $a$, a part of which is expended upon the pole-piece $b$, which becomes magnetized with the same polarity as the poles of the magnet with which they are connected, just as in the magnets of this class heretofore made, but with somewhat less attractive power from the same-sized permanent magnet. When, however, the cores are affected by a current in the coils $c$, or some other inducing agent other than the magnet $a$, the connecting-piece $e$ forms practically a circuit for the cores, shunting as it were the magnetism that would otherwise extend through the magnet $a$, which thus remains practically unaffected by the current in the coils $c$, and resumes its influence over the cores $b$ as soon as such current is removed.

In practice a current which, in an instrument not having a connecting device, $e$, would neutralize or reverse the magnetism of the permanent magnet $a$, so that when the current was removed the cores $b$ would either receive no magnetism or magnetism of reversed polarity to that which they had before the current was applied, will, when the connector is used, not produce any appreciable effect upon the magnet $a$, so that as soon as the current is removed the cores will return as nearly as can be determined to the same condition that they had before the current was applied.

I may, if desired, employ any usual regulating-bar, it connecting the arms of the permanent magnet.

I claim—

1. An electro-magnetic device consisting of a permanent magnet and an inductor in magnetic contact with each other, said inductor consisting of soft-iron cores and inductive coils wound thereon, combined with a fixed magnetic connector joining the cores of the inductor substantially at the point of contact or junction with the permanent magnet, substantially as and for the purposes described.

2. An electro-magnetic device consisting of a permanent magnet and an inductor placed in magnetic contact with each other, said inductor consisting of two soft-iron cores and inductive coils wound thereon, combined with a magnetic connector joining the cores of the inductor substantially at the point of contact or junction with the permanent magnet, said magnetic connector possessing sufficient magnetic conductivity to form a magnetic shunt which substantially prevents any magnetism induced in the cores by the inductive coils thereon from passing through the permanent magnet, while permitting sufficient magnetism from the permanent magnet to flow through the said cores and polarize them, substantially as and for the purposes described.

In testimony whereof I have signed my name to this specification in the presence of two subscribing witnesses.

JOHN C. WILSON.

Witnesses:
G. W. GREGORY,
B. J. NOYES.